(12) United States Patent
Shibata

(10) Patent No.: US 6,641,882 B1
(45) Date of Patent: Nov. 4, 2003

(54) PACKAGING BAG

(75) Inventor: Yukihiko Shibata, Nagoya (JP)

(73) Assignee: Daiwa Gravure Co., Ltd., Nagoya (JP)

( * ) Notice: Subject to any disclaimer, the term of this patent is extended or adjusted under 35 U.S.C. 154(b) by 102 days.

(21) Appl. No.: 09/723,174

(22) Filed: Nov. 27, 2000

(51) Int. Cl.$^7$ .................. B32B 27/32; B32B 31/12; B32B 33/00

(52) U.S. Cl. .............. 428/35.7; 426/112; 426/113; 426/118; 426/119; 426/120; 428/43; 428/349; 428/476.1; 428/476.3; 428/476.9

(58) Field of Search .............. 428/35.7, 43, 349, 428/476.1, 476.3, 476.9; 426/112, 113, 118, 119, 120

(56) References Cited

U.S. PATENT DOCUMENTS 5,075,119 A  * 12/1991 Mendenhall ............... 426/113
5,243,164 A  *  9/1993 Erickson et al. .......... 219/10.55 E
6,383,583 B1 *  5/2002 Ninomiya et al. ......... 428/35.4

* cited by examiner

Primary Examiner—Sandra M. Nolan
(74) Attorney, Agent, or Firm—Fildes & Outland, P.C.

(57) ABSTRACT

An object of the present invention is to: eliminate the need to provide a tool such as a pair of scissors for partly opening a packaging bag; and allow the packaging bag to be partly opened easily when it is heated in a microwave oven, based on an increase in internal pressure caused by vapors associated with heating. To attain this object, the present invention provides a packaging bag made using as a material a synthetic resin film adapted for a microwave oven, wherein a layer constituting an inner surface is formed of a blend of a straight chain low-density polyethylene resin and a polybutene-1 resin, and one of opposite heat sealed portions perpendicular to a film flowing direction has a portion with a smaller heat seal width at an appropriate position.

11 Claims, 12 Drawing Sheets

PACKAGING BAG

FIELD OF THE INVENTION

The present invention relates to a packaging bag for housing foods or edible liquids which are to be heated in a microwave oven, or cosmetics such as warm packs.

BACKGROUND OF THE INVENTION

In the prior art, when a food housed in a sealed packing bag is heated in a microwave oven, the packaging bag must be partly cut open with a pair of scissors or the like in order to prevent rupture of the bag which may occur when the internal pressure of the bag increases due to vapors arising from the heating.

Conventionally, a tool such as a pair of scissors, however, must be provided to partly cut the packaging bag open; this is disadvantageously cumbersome.

DISCLOSURE OF THE INVENTION

It is an object of the present invention to solve the above problem to eliminate the need to provide a tool such as a pair of scissors or the like for partly cutting a packing bag open and to allow the packing bag to be partly opened easily when the bag is heated in a microwave oven, based on an increase in the internal pressure thereof caused by vapors associated with heating.

The points of the invention for achieving this object are listed below.

1. A packaging bag made using as a material a synthetic resin film adapted for a microwave oven, wherein a layer constituting an inner surface is formed of a blend of a straight chain low-density polyethylene resin and a polybutene-1 resin, and one of opposite heat sealed portions perpendicular to a film flowing direction has a portion with a smaller heat seal width at an appropriate position.

2. The packaging bag according to claim 1, wherein the straight chain low-density polyethylene has a density between 0.915 and 0.950.

3. The packaging bag according to claim 1, wherein a blend ratio between the straight chain low-density polyethylene and the polybutene-1 is between 70:30 and 98:2.

4. The packaging bag according to claim 2, wherein a blend ratio between the straight chain low-density polyethylene and the polybutene-1 is between 70:30 and 98:2.

5. The packaging bag according to claim 1, wherein the bag is internally partitioned using partitioning heat sealed portions to form a plurality of spaces.

6. The packaging bag according to claim 5, wherein the straight chain low-density polyethylene has a density between 0.915 and 0.950.

7. The packaging bag according to claim 5, wherein a blend ratio between the straight chain low-density polyethylene and the polybutene-1 is between 70:30 and 98:2.

8. The packaging bag according to claim 6, wherein a blend ratio between the straight chain low-density polyethylene and the polybutene-1 is between 70:30 and 98:2.

This configuration provides a packaging bag that eliminates the need to provide a tool such as a pair of scissors for partly opening the packaging bag, wherein the layer constituting the inner surface of a film material constituting the bag is formed of the blend of the straight chain low-density polyethylene resin and the polybutene-1 resin, resulting in a difference in heat sealing strength between two perpendicular directions, so that when the bag is heated in a microwave oven, it can be partly opened easily due to an increase in the internal pressure thereof caused by vapors arising from the heating. Additionally, the packaging bag is internally partitioned using the partitioning heat sealed portions to form the plurality of spaces in order to house different types of contents in the corresponding spaces, so that when the internal pressure of the packaging bag increases, the partitioning heat sealed portions are released to mix the different types of contents in the corresponding spaces together.

DESCRIPTION OF THE EMBODIMENTS

FIGS. 1 to 6 show a first embodiment of the present invention.

In these figures, a packaging bag 1 comprises a layer 2 constituting an inner surface side, which is a layer acting as a seal surface and made of a film material composed of a blend of straight chain low-density polyethylene and polybutene-1, and is sealed on four sides, so as to house a food or edible liquid inside in a sealed state. The packaging bag 1 comprises a layer 3 constituting an outer surface side and laminated on the layer 2 constituting the inner surface, the layer 3 being composed of a resin comprising, for example, a biaxially drawn nylon, which has a higher melting point than the layer 2 constituting the inner surface side; the packaging bag 1 is thus made of this film material of the two-layer structure. The straight chain low-density polyethylene or a material of the layer 2 constituting the inner surface side has a density between 0.915 and 0.950, and a blend ratio between the straight chain low-density polyethylene and polybutene-1 is set between 70:30 and 98:2.

It was found out by the inventors that when the packaging bag 1 is formed by heat sealing the film material, a difference occurs in heat sealing strength in a heat sealed portion in a direction perpendicular (X) to a film flowing direction (shown by an arrow A) and a heat sealed portion in a direction parallel (Y) with the film flowing direction. That is, there is a tendency that the strength of the perpendicular (X)-directional heat sealed portion in its width direction corresponding to the film flowing direction is lower than that of the parallel (Y)-directional heat sealed portion in its width direction perpendicular to the film flowing direction (A). The reason is shown below.

Figure 3:
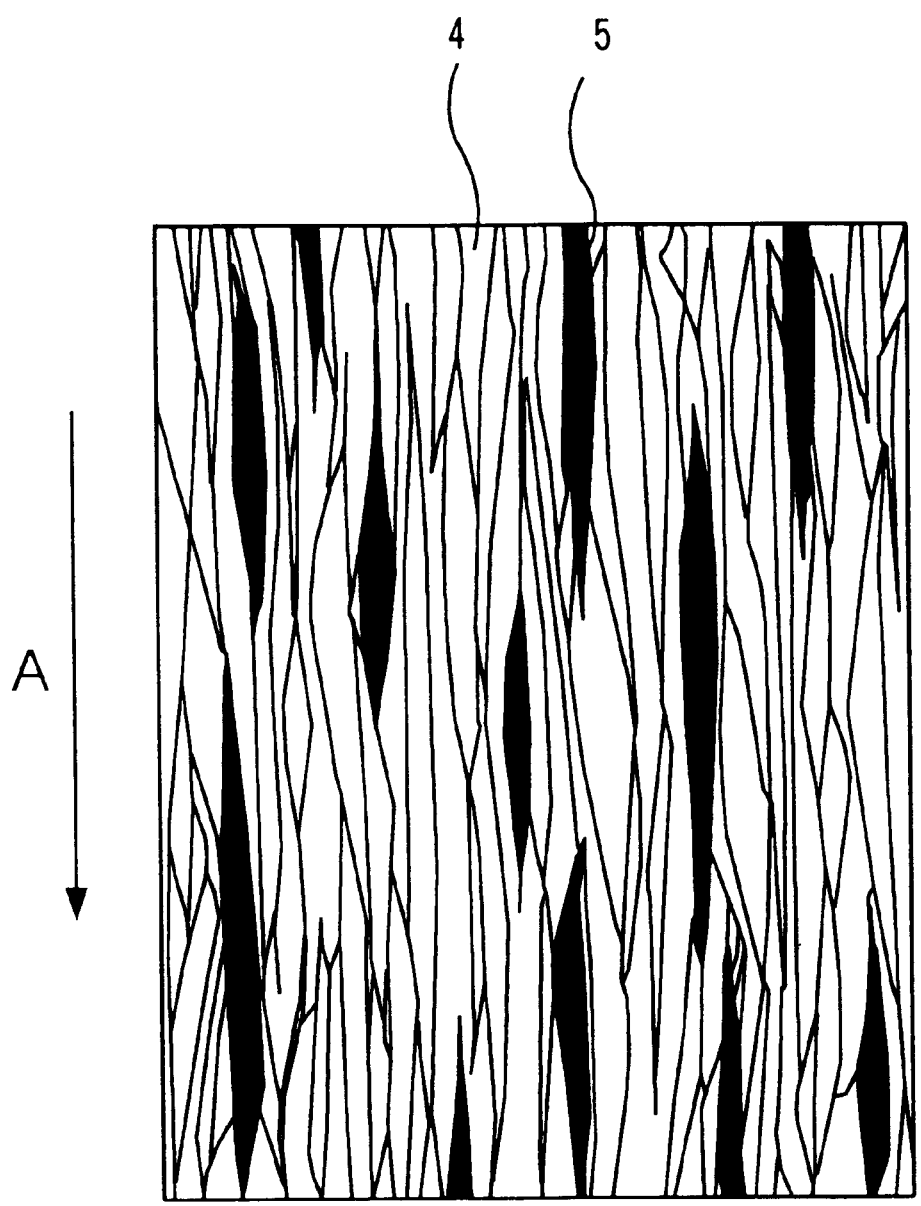
FIG. 3 is an explanatory drawing showing the directionality of a resin.
Figure 4:
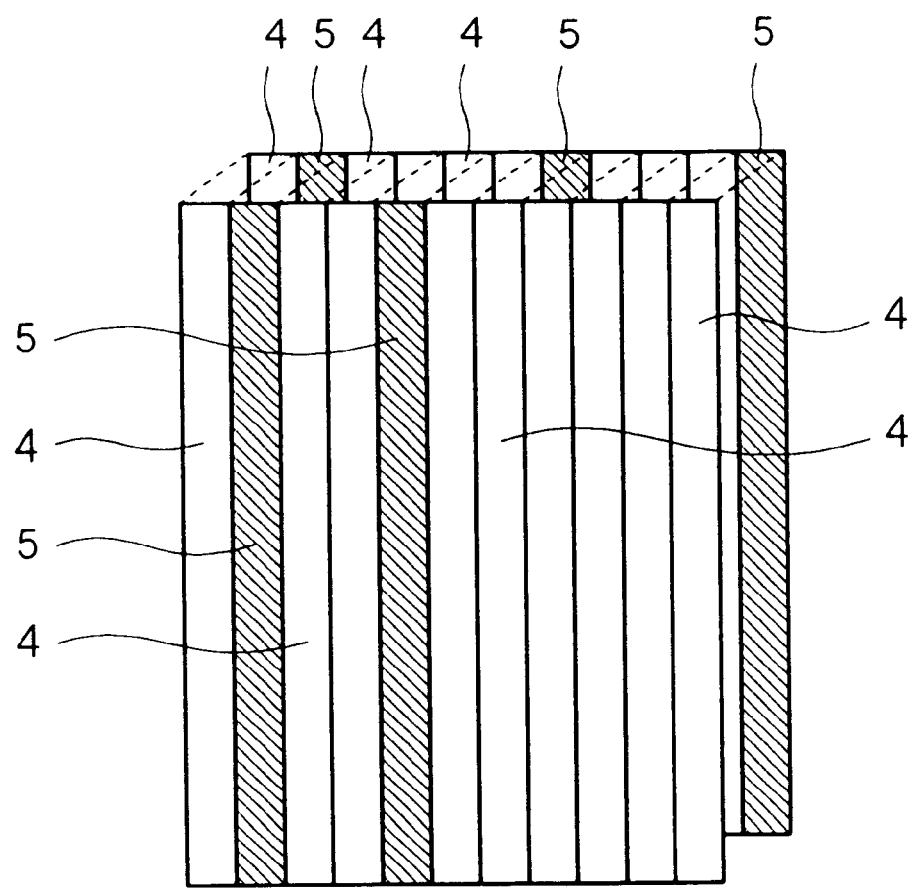
FIG. 4 is an explanatory drawing showing how straight chain low-density polyethylene resin portions and polybutent-1 resin portions are combined together in a heat sealed portion.

The resin used as the material of the layer 2 constituting the inner surface side of the packaging bag 1 for housing a food or edible liquid to be cooked in a microwave oven is the blend of the straight chain low-density polyethylene and the polybutene-1, and the film formation speed of the layer 2 constituting the inner surface side comprising the blended film material causes the straight chain low-density polyethylene and the polybutene-1 to show uniaxial orientation. That is, the film is formed in such a manner that the straight chain low-density polyethylene and the polybutene-1 are irregularly arranged. This state is shown in FIG. 3, where reference numeral 4 denotes a straight chain low-density polyethylene resin and reference numeral 5 denotes a polybutene-1 resin. Since the layer 2 constituting the inner surface thus has uniaxial orientation, when two sheets of the above described film material having the two-layered structure are stacked on each other and the peripheries thereof are heat-sealed in order to produce the packaging bag 1 sealed on four sides, three combination patterns are created as shown in FIG. 4. They are: a pattern in which the straight chain low-density polyethylene resin 4 and the straight chain low-density polyethylene resin 4 are opposed to each other; a pattern in which the polybutene-1 resin 5 and the polybutene-1 resin 5 are opposed to each other; and a pattern in which the straight chain low-density polyethylene resin 4 and the polybutene-1 resin 5 are opposed to each other.

Here, the straight chain low-density polyethylene resin 4 and straight chain low-density polyethylene resin 4 are heat-sealed together, and the polybutene-1 resin 5 and the polybutene-1 resin 5 are heat-sealed together. In each case, both resins are of the same type, so that the heat sealing strength obtained is within the range of characteristics of the respective resin.

However, in a portion where the straight chain low-density polyethylene resin 4 and the polybutene-1 resin 5 are opposed to each other, that is, different types of resins are opposed to each other, the respective individual characteristic heat sealing strength is hindered from being obtained. The above patterns are mixed on the heat-sealed surface. A phenomenon described below is caused by the uniaxial orientation, the heat sealing characteristics resulting from the combinations of the above described three patterns, and the heat sealing direction.

Figure 5:
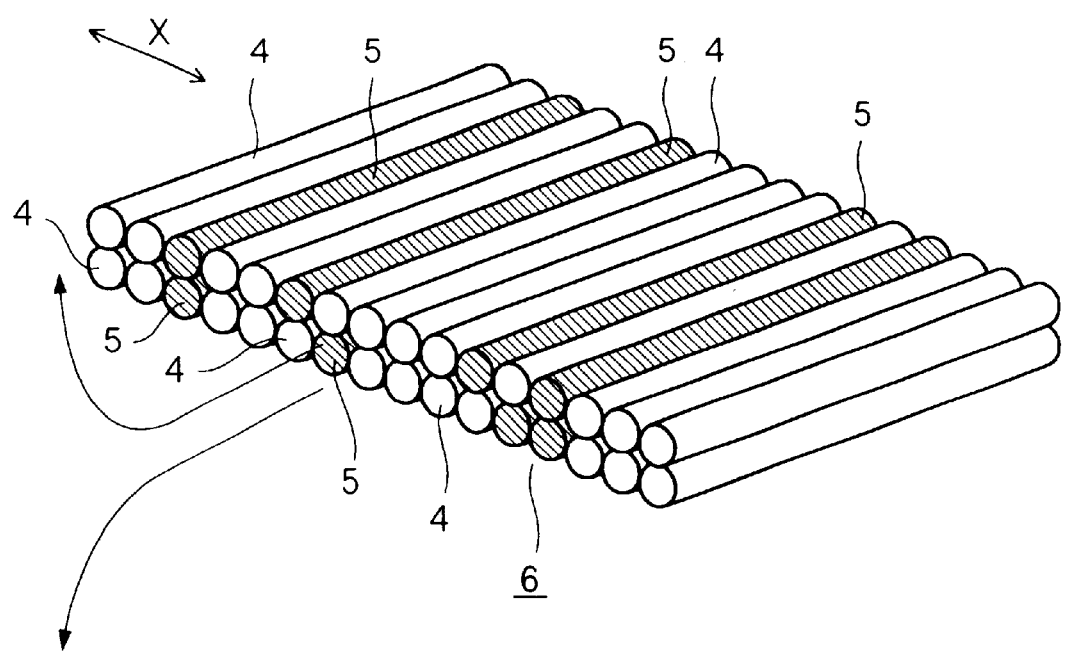
FIG. 5 is an enlarged view of an integral part of a short side-side seal edge of the heat sealed portion.

The combinations of the three patterns appear irregularly at a sealed edge in that width direction of the heat sealed portion perpendicular (X) to the film flowing direction (shown by the arrow A) which corresponds to the film flowing direction (see FIG. 5). In contrast, any of the combinations of the three patterns appears at a sealed edge in that width direction of the heat sealed portion parallel (Y) with the film flowing direction which extends perpendicularly to the film flowing direction (see FIG. 6).

It is a well known fact that in measuring a time length required for releasing the heat sealed portion when the packaging bag 1 is expanded due to vapors arising from heating in a microwave oven, the larger the heat sealing width is the longer time the releasing requires. Since the combinations of the three patterns appear irregularly in the width direction of the heat sealed portion perpendicular (X) to the film flowing direction (shown by the arrow A) which corresponds to the film flowing direction, the combinations of the straight chain low-density polyethylene resin 4 and the straight chain low-density polyethylene resin 4, and the polybutene-1 resin 5 and the polybutent-1 resin 5, both combinations serving to increase the strength, occupy less than 100% of the heat sealing width, and the combination of the straight chain low-density polyethylene resin 4 and the polybutene-1 resin 5 is present at the sealed edge, thereby reducing the heat sealing strength.

In the width direction of the heat sealed portion parallel (Y) with the film flowing direction (shown by the arrow A) which extends perpendicularly to the film flowing direction, either the combination of the straight chain low-density polyethylene resin 4 and the straight chain low-density polyethylene resin 4 or the combination of the polybutene-1 resin 5 and the polybutene-1 resin 5 or the combination of the straight chain low-density polyethylene resin 4 and the polybutene-1 resin 5 may appear at the sealed edge because of the uniaxial orientation of molecules.

When the heat sealing strength in the width direction of the heat sealed portion perpendicular (X) to the film flowing direction (shown by the arrow A) which corresponds to the film flowing direction (shown by the arrow A) is compared with that in the width direction of the heat sealed portion parallel (Y) with the film flowing direction (shown by the arrow) which extends perpendicularly to the film flowing direction (shown by the arrow), the strength is high if the combination of the straight chain low-density polyethylene resin 4 and the straight chain low-density polyethylene resin 4 or the combination of the polybutene-1 resin 5 and the polybutene-1 resin 5 appears, while the strength is low if the combination of the straight chain low-density polyethylene resin 4 and the polybutene-1 resin 5 appears.

The heat sealing strength refers to the strength of the sealed edge, and in the width direction of the heat sealed portion perpendicular (X) to the film flowing direction (shown by the arrow A) which corresponds to the film flowing direction (shown by the arrow A), the combination of the straight chain low-density polyethylene resin 4 and the straight chain low-density polyethylene resin 4, the combination of the polybutene-1 resin 5 and the polybutene-1 resin 5 and the combination of the straight chain low-density polyethylene resin 4 and the polybutene-1 resin 5 appear in the perpendicular (X) direction randomly as shown in FIG. 5, thereby reducing releasing resistance strength.

Figure 6:
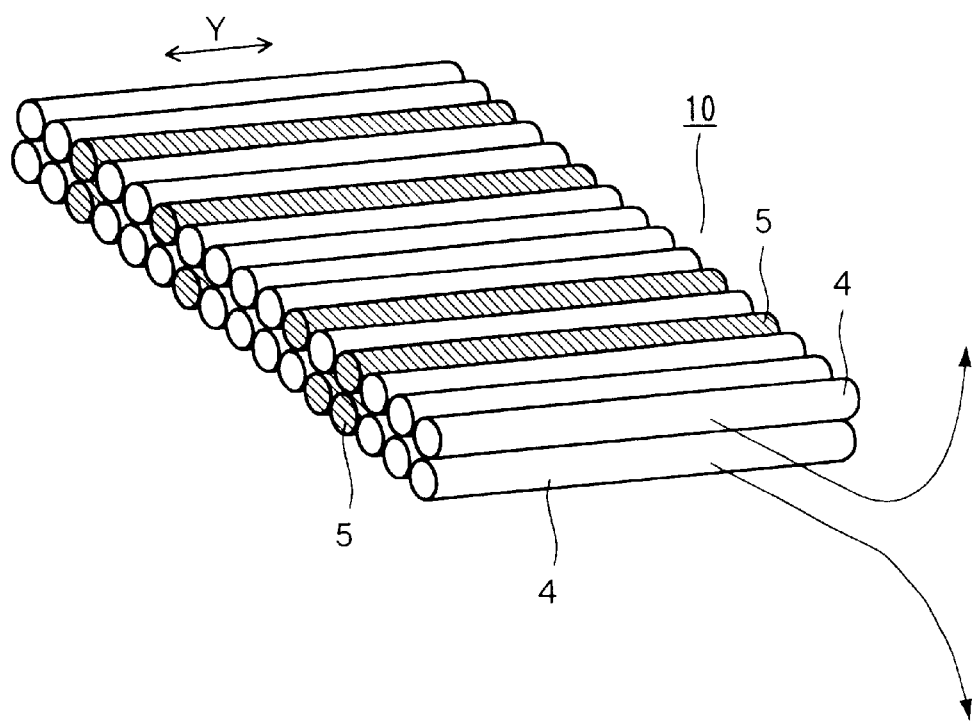
FIG. 6 is an enlarged view of an integral part of a long side-side seal edge of the heat sealed portion.

Whereas, in the width direction of the heat sealed portion parallel (Y) with the film flowing direction (shown by the arrow A) which extends perpendicularly to the film flowing direction (shown by the arrow A), the combination of the straight chain low-density polyethylene resin 4 and the straight chain low-density polyethylene resin 4 and the combination of the polybutene-1 resin 5 and the polybutene-1 resin 5 appear without fail in its width direction and along the entire length of the heat sealed portion in the film flowing direction (shown by the arrow A), as shown in FIG. 6. Accordingly, although where the combination of the straight chain low-density polyethylene resin 4 and the polybutene-1 resin 5 appears, the strength is low and the heat sealed portion is released, if this combination is followed at the next moment by the combination of the straight chain low-density polyethylene resin 4 and the straight chain low-density polyethylene resin 4 or the combination of the polybutene-1 resin 5 and the polybutene-1 resin 5, the heat sealing strength restores to be high.

In total, the heat sealing strength is higher in the width direction of the heat sealed portion perpendicular (X) to the film flowing direction (shown by the arrow A) which corresponds to the film flowing direction (shown by the arrow A) than in the width direction of the heat sealed portion parallel (Y) with the film flowing direction (shown by the arrow A) which extends perpendicularly to the film flowing direction (shown by the arrow A).

To realize this characteristic, the straight chain low-density polyethylene that is the material of the layer 2 constituting the inner surface side as described above preferably has a density of 0.915 or higher and more preferably between 0.915 and 0.950, the blend ratio between the straight chain low-density polyethylene and the polybutene-1 is preferably between 70:30 and 98:2.

The density of the straight chain low-density polyethylene that is the material of the layer 2 constituting the inner surface side is proportional to its melting point. With a density of less than 0.915, the layer 2 constituting the inner surface side exhibits a low heat resistance during heating in an microwave oven and it is thus difficult to attain the object of the present invention.

In addition, even if the straight chain low-density polyethylene that is the material of the layer 2 constituting the inner surface side has a density of 0.95 or higher, if the blend ratio between the straight chain low-density polyethylene and the polybutene-1 is out of the range between 70:30 and 98:2, it is hard to produce a clear difference in heat sealing strength between that width direction of the heat sealed portion perpendicular (X) to the film flowing direction (shown by the arrow A) which corresponds to the film flowing direction (shown by the arrow A) and that width direction of the heat sealed portion parallel (Y) with the film flowing direction (shown by the arrow A) which extends perpendicularly to the film flowing direction (shown by the arrow A), thereby preventing the object of the present invention from being achieved easily.

Figure 1:
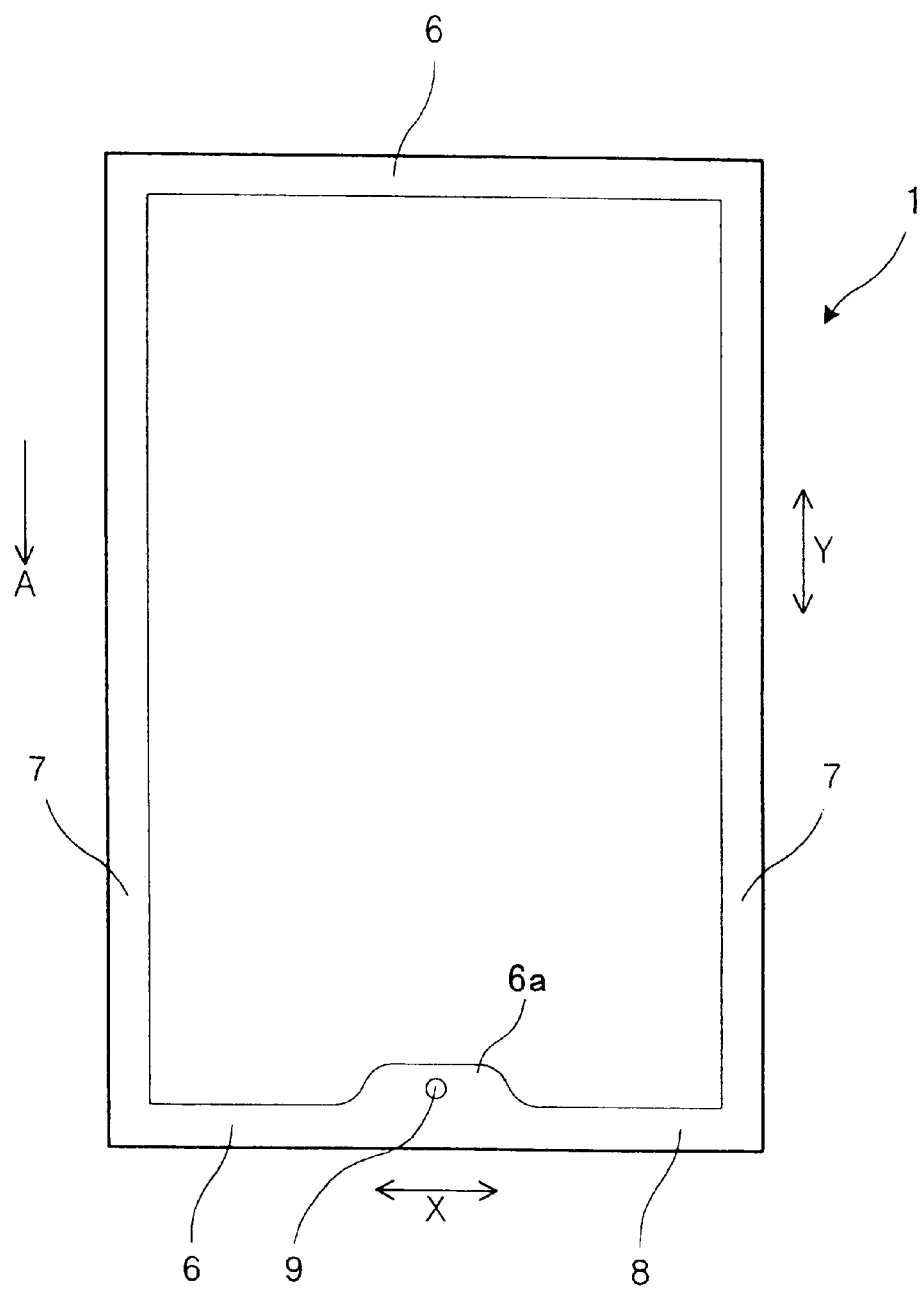
FIG. 1 is a top view of a packaging bag according to a first embodiment of the present invention.
Figure 2:
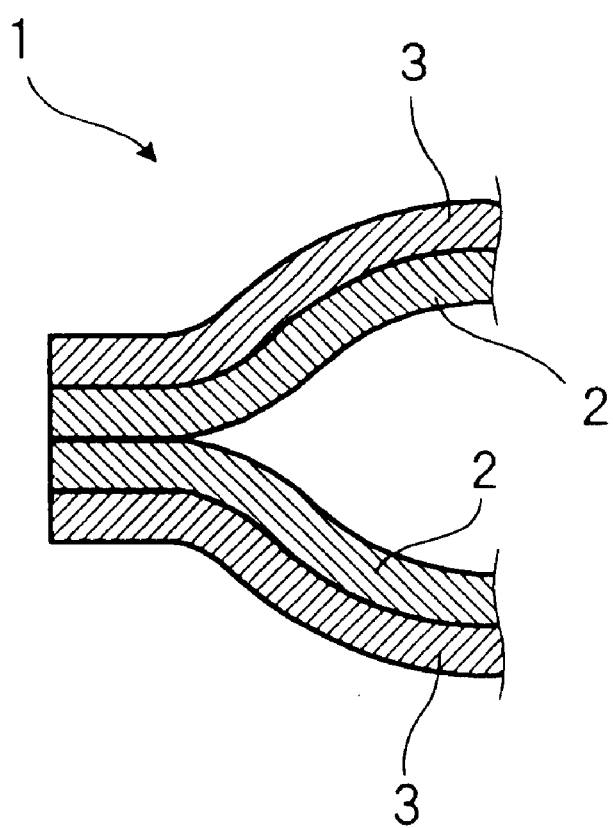
FIG. 2 is an enlarged sectional view of the packaging bag.

In this embodiment, based on the above characteristics, two sheets of the above described two-layered film material are stacked on each other and peripheries thereof are heat-sealed together to-produce the planner rectangular packaging bag 1 sealed on four sides as shown in FIG. 1. In this case, the heat sealing strength in the width direction of the heat sealed portion 6 perpendicular (X) to the film flowing direction (shown by the arrow A), that is, the short side-side heat sealed portion 6, which-width direction corresponds to the film flowing direction (shown by the arrow A) is set lower than that in the width direction of the heat sealed portion 6 parallel (Y) with the film flowing direction (shown by the arrow A), that is, the long side-side heat sealed portion 7, which width direction corresponds to the film flowing direction (shown by the arrow A) so that an increase in the internal pressure of the packaging bag 1 causes the heat sealed portion to be released from the short side-side heat sealed portion 6 in the width direction.

Specifically, to allow one of the opposite short side-side heat sealed portions 6 to be released earlier than the other in the width direction, a heat sealing width of one of the short side-side heat sealed portions 6 at its length-wise and width-wise center are set larger than that in the other portions thereof, an aperture portion 9 is formed in at least one of the sheets of the film materials 8 at a position of this wide heat sealed portion 6a which is closer to an inner end of the portion 6, and the width-wise distance between the inner end portion of the one of the heat sealed portions and the aperture portion 9 is set shorter than the width-wise dimension of the other short side-side heat sealed portion 6.

In short, one of the short side-side opposite heat sealed portions 6 has a portion with a smaller heat sealing width formed at an appropriate portion so that an increase in the internal pressure of the packaging bag 1 causes the portion with the smaller heat sealing width to be released and opened earlier so as to remove vapors from the bag.

Figure 7:
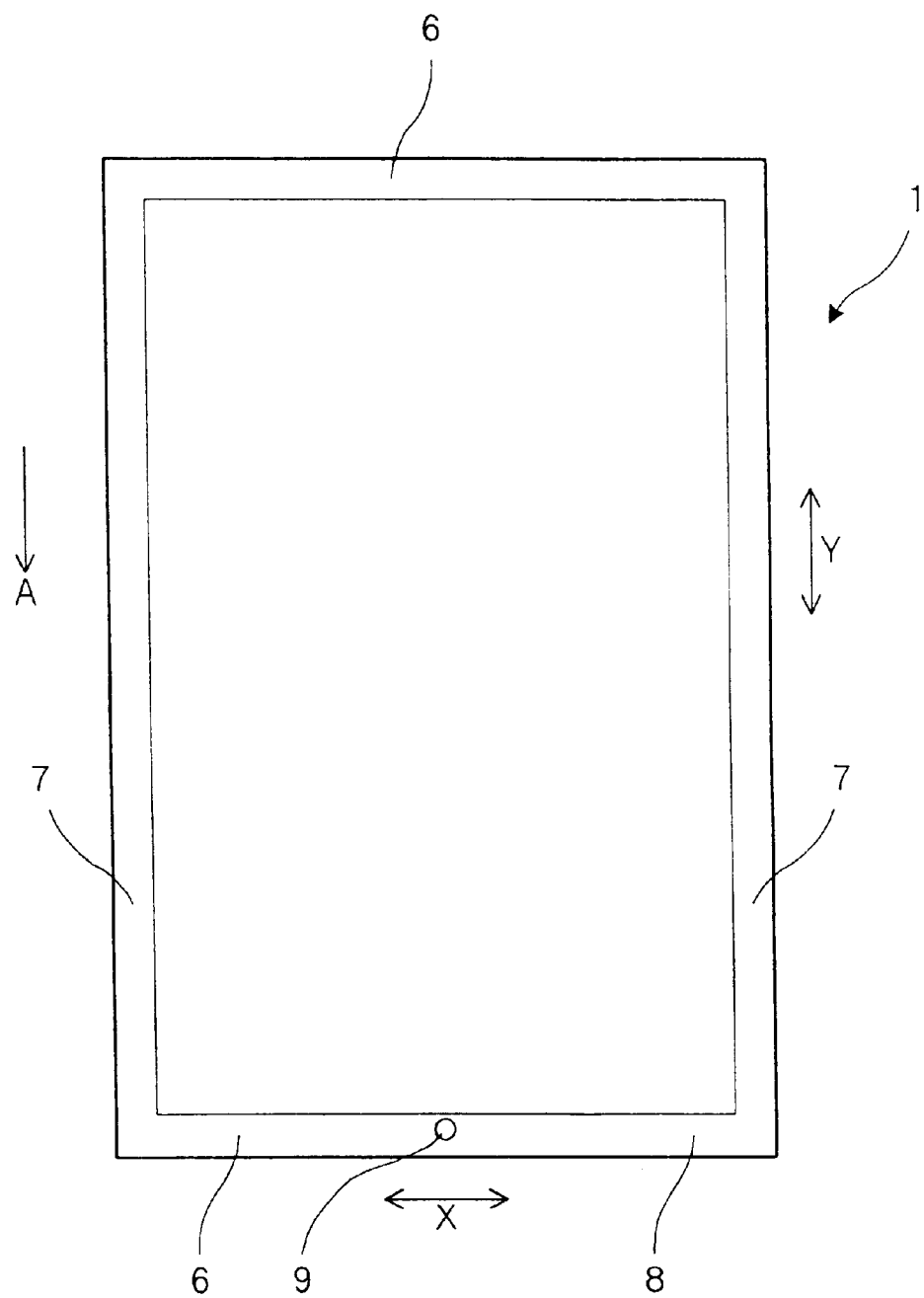
FIG. 7 is a top view of a packaging bag according to a second embodiment of the present invention.

FIG. 7 shows a second embodiment of the present invention.

The second embodiment will be described based on FIG. 7. In the first embodiment, the heat sealing width of the one of the short side-side heat sealed portions 6 at its length-wise and width-wise center is set larger than that in the other portions, and the aperture portion 9 is formed in at least one of the sheets of the film material 8 at the portion of this wide heat sealed portion 6a which is closer to the inner end of the portion 6a, whereas in the second embodiment, one of the short side-side heat sealed portions 6 has a same width along the entire length-wise length and an aperture portion 9 is formed in at least one of the sheets of the film material 8 at the length-wise and width-wise center of this heat sealed portion 6. This configuration also forms a portion with a smaller heat sealing width in one of the heat sealing portions 6 so as to provide effects similar to those of the above described first embodiment.

Figure 8:
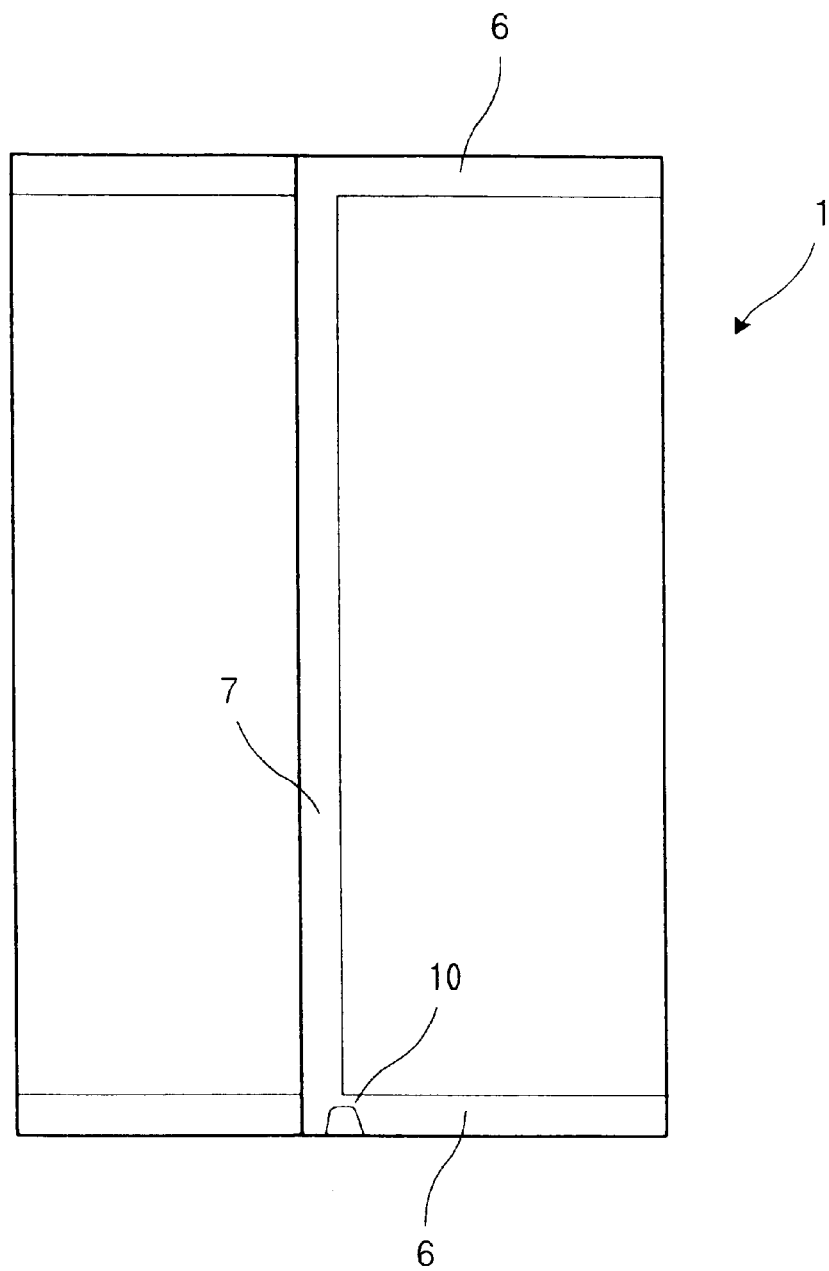
FIG. 8 is a top view of a packaging bag according to a third embodiment of the present invention.

FIG. 8 shows a third embodiment of the present invention.

The third embodiment will be explained based on FIG. 8. In the first embodiment, the packaging bag 1 is heat sealed on four sides, but in the third embodiment, the packaging bag 1 may be heat sealed at three portions to be in a jointly sealed form. That is, the bag may comprise the short side-side opposite heat sealed portions 6 and a long side jointly heat sealed portion 7. In short, the shape of the packaging bag 1 and the portions to be heat sealed may be determined as appropriate depending on the contents to be housed in the bag. The contents may be food or edible liquid, or others than the food or edible liquid.

Further, the packaging bag 1 according to the third embodiment shown in FIG. 8 has a portion with a smaller heat sealing width formed at the length-wise and width-wise center of the one of the short side-side opposite heat sealed portions 6 instead of the aperture portion 9 formed in the above described first embodiment.

Figure 9:
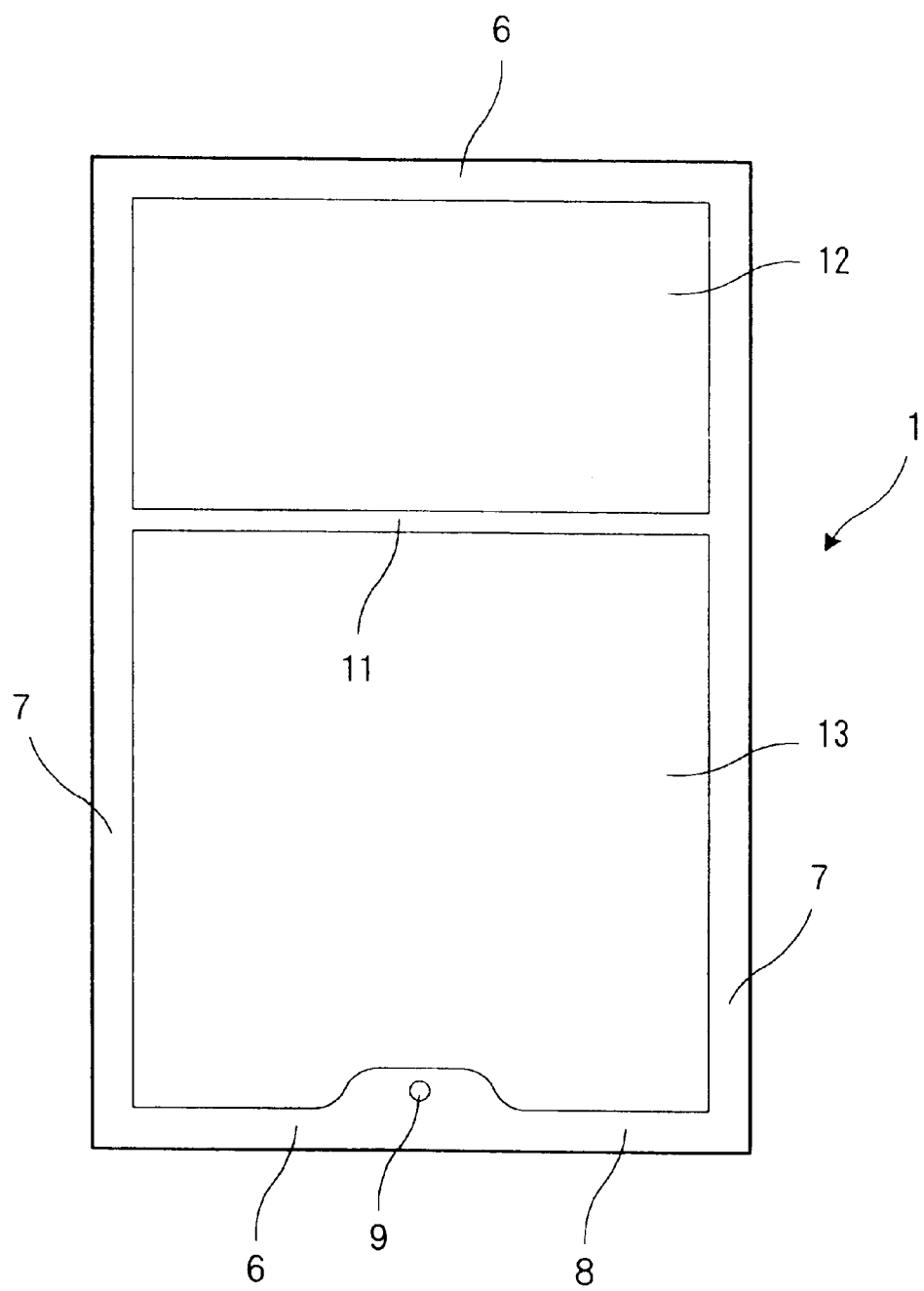
FIG. 9 is a top view of a packaging bag according to a fourth embodiment of the present invention.
Figure 10:
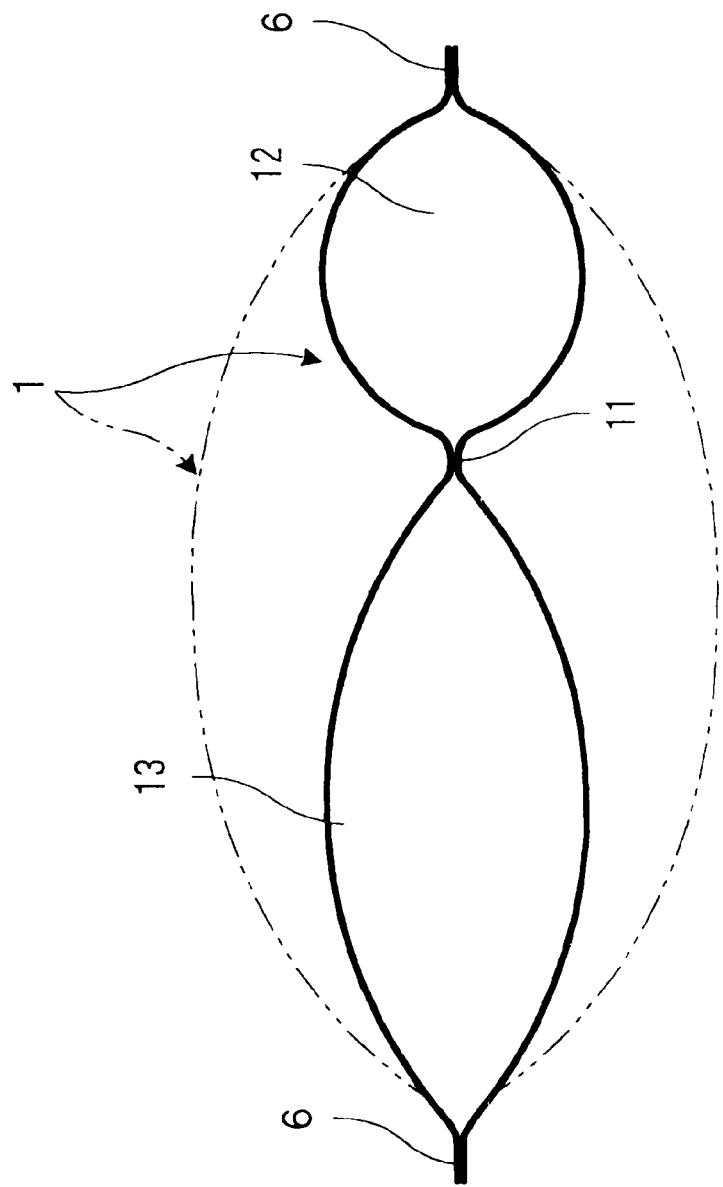
FIG. 10 is a sectional view of the packaging bag.

The fourth embodiment will be described based on FIGS. 9 and 10.

This embodiment has the same configuration as the first embodiment except that the interior of the bag is partitioned perpendicularly (X) to the film flowing direction (shown by the arrow A). That is, a partitioning heat sealed portion 11 parallel with the short side-side heat sealed portion 6 partitions the bag to form two spaces 12 and 13 for housing different types of contents respectively, and an increase in the internal pressure of the packaging bag 1 causes the partitioning heat sealed portion 11 to be released so as to mix together the different types of contents in the spaces 12 and 13. In this fourth embodiment, the packaging bag 1 is sealed on four sides as in the first embodiment, but may be jointly sealed as in the third embodiment.

Figure 11:
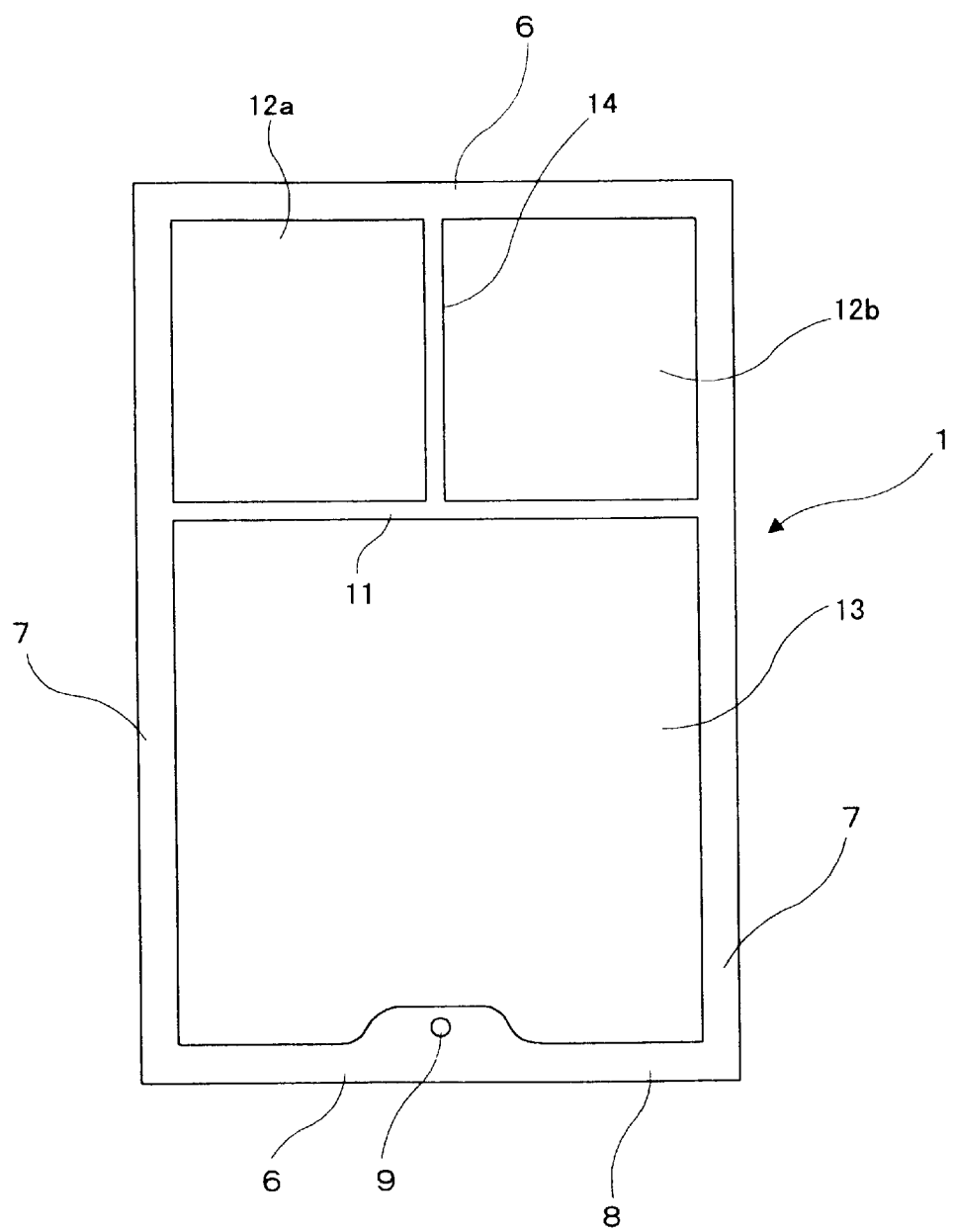
FIG. 11 is a top view of a packaging bag according to a fifth embodiment of the present invention.

FIG. 11 shows a fifth embodiment of the present invention.

The fifth embodiment will be described based on FIG. 11. The packaging bag 1 according to the fifth embodiment has the same configuration as the fourth embodiment except that one 12 of the two spaces 12 and 13 of the packaging bag 1 is partitioned at a partitioning heat sealed portion 14 extending parallel with the film flowing direction (shown by the arrow A), to form three spaces 12a, 12b, and 13 in the packaging bag 1.

Figure 12:
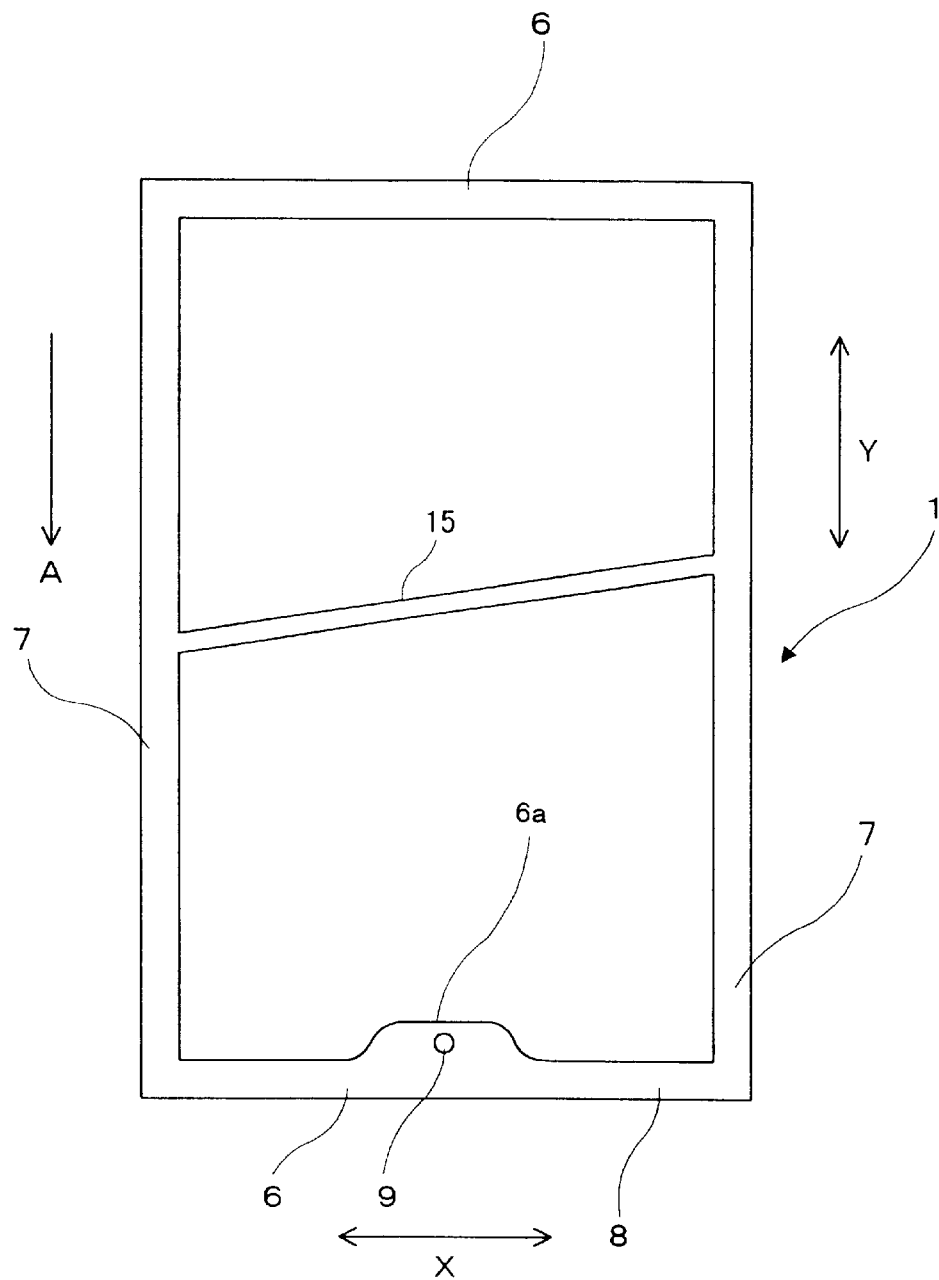
FIG. 12 is a top view of a packaging bag according to a sixth embodiment of the present invention.

FIG. 12 shows a sixth embodiment of the present invention.

The sixth embodiment will be described based on FIG. 12. The packaging bag 1 according to the sixth embodiment has the same configuration as the first embodiment except that to partition the interior of the packaging bag 1 into two, a partitioning heat sealed portion 15 is formed in such a fashion as to extend obliquely relative to the short side-side heat sealed portion 6 perpendicular (X) to the film flowing direction (shown by the arrow A), and this oblique direction is determined so as to obtain a required releasing strength.

In each of the above described embodiments, the packaging bag 1 is made of the two-layered film material formed by laminating the layer 3 outside the layer 2 constituting the inner surface side, the layer 3 being composed of the resin having a higher melting point than the layer 2 constituting the inner surface side. The film material is not particularly limited but only the layer 2 constituting the inner surface side is required to meet the above described conditions. Additionally, although detailed description has been omitted, in each of the above described embodiments, the film material may contain an additive such as an anti-blocking agent, a slipping agent, or an antioxidant.

What is claimed is:

1. A packaging bag made using a synthetic resin film as a material, said synthetic resin film comprising a layer constituting an inner surface and a layer constituting an outer surface; peripheries of more than one of said synthetic resin films being heat sealed to form a bag shape in such manner that said inner surfaces are opposed to each other, wherein said layer constituting the inner surface comprises a straight chain low-density polyethylene resin and a polybutene-1 resin which are irregularly arranged in a film flow direction to show uniaxial orientation;

in a perpendicular direction to the film flow direction, heat sealed surfaces of said resin films have three combinations: a straight chain low-density polyethylene resin and a straight chain low-density polyethylene resin are opposed to each other; a polybutene-1 resin and a polybutene-1 resin are opposed to each other; and a straight chain low-density polyethylene resin and a polybutene-1 resin are opposed to each other; said combinations existing at random;

in a parallel direction to the film flow direction, heat sealed surfaces of said resin films extend along the entire length of the film in the film flow direction, said heat sealed surfaces have three combinations: a straight chain low-density polyethylene resin and a straight chain low-density polyethylene resin are opposed to each other; a polybutene-1 resin and a polybutene-1 resin are opposed to each other; and a straight chain low-density polyethylene resin and a polybutene-1 resin are opposed to each other.

2. The packaging bag according to claim 1, wherein the straight chain low-density polyethylene has a density between 0.915 and 0.950.

3. The packaging bag according to claim 1, wherein a blend ratio between the straight chain low-density polyethylene and the polybutene-1 is between 70:30 and 98:2.

4. The packaging bag according to claim 2, wherein a blend ratio between the straight chain low-density polyethylene and the polybutene-1 is between 70:30 and 98:2.

5. The packaging bag according to claim 1, wherein the bag is internally partitioned using partitioning heat sealed portions to form a plurality of spaces.

6. The packaging bag according to claim 5, wherein the straight chain low-density polyethylene has a density between 0.915 and 0.950.

7. The packaging bag according to claim 5, wherein a blend ratio between the straight chain low-density polyethylene and the polybutene-1 is between 70:30 and 98:2.

8. The packaging bag according to claim 6, wherein a blend ratio between the straight chain low-density polyethylene and the polybutene-1 is between 70:30 and 98:2.

9. The packaging bag according to claim 1, wherein an aperture portion is formed in the heat sealed surfaces of the resin films having combinations: the straight chain low-density polyethylene resin and the straight chain low-density polyethylene resin; the polybutene-1 resin and the polybutene-1 resin; and the straight chain low-density polyethylene resin and the polybutene-1 resin; said combination patterns existing at random.

10. The packaging bag according to claim 9, wherein a portion of a smaller heat sealing width is formed instead of an aperture portion at the heat sealed portion.

11. The packaging bag according to claim 9, which is adapted for a microwave oven.

* * * * *